(12) United States Patent
Maucec

(10) Patent No.: US 9,330,064 B2
(45) Date of Patent: May 3, 2016

(54) SYSTEMS AND METHODS FOR GENERATING UPDATES OF GEOLOGICAL MODELS

(75) Inventor: Marko Maucec, Englewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 344 days.

(21) Appl. No.: 13/883,257

(22) PCT Filed: Nov. 2, 2010

(86) PCT No.: PCT/US2010/055117
§ 371 (c)(1),
(2), (4) Date: Jul. 18, 2013

(87) PCT Pub. No.: WO2012/060821
PCT Pub. Date: May 10, 2012

(65) Prior Publication Data
US 2013/0318141 A1    Nov. 28, 2013

(51) Int. Cl.
*G06F 17/14*    (2006.01)
*G01V 99/00*    (2009.01)

(52) U.S. Cl.
CPC ............ *G06F 17/147* (2013.01); *G01V 99/005* (2013.01)

(58) Field of Classification Search
CPC .................................................... G01V 99/005
USPC ................................................. 708/400, 402
See application file for complete search history.

(56) References Cited

U.S. PATENT DOCUMENTS

| | | | | |
|---|---|---|---|---|
| 4,982,282 | A * | 1/1991 | Saito | H04N 19/00 358/1.9 |
| 6,160,919 | A | 12/2000 | Hale | |
| 7,274,993 | B2 * | 9/2007 | Hu | E21B 49/00 702/1 |
| 2007/0055447 | A1 | 3/2007 | Mickaele et al. | |
| 2008/0162099 | A1 * | 7/2008 | Vega Velasquez | E21B 49/00 703/10 |
| 2010/0198570 | A1 * | 8/2010 | Sarma | G06F 17/5022 703/10 |
| 2012/0232865 | A1 * | 9/2012 | Maucec | G01V 1/30 703/2 |
| 2012/0265512 | A1 * | 10/2012 | Hu | G01V 99/005 703/10 |

OTHER PUBLICATIONS

Begun, "Reservoir Parameter Estimation for Reservoir Simulation using Ensemble Kalman Filter (EnKF)" Sep. 2009.*
Jafarpour et al, "Efficient Permeabilty Parameterization with the Discrete Cosine Transform", Feb. 28, 2007.*
Li, "Continuous Reservoir Model Updating by Ensemble Kalman Filter on Grid Computing Archtectures", Dec. 2008.*
Przybysz-Jarnut, "Hydrocarbon Reservoir Parameter Estimation Using Production Data and Time-Lapse Seismic", May 25, 2010.*
Li, Xin; Continuous Reservoir Model Updating by Ensemble Kalman Filter on Grid Computing Architectures; Dec. 2008;172 pgs.
Przybysz-Jarnut; Hydrocarbon Reservoir Parameter Estimation Using Production Data and Time-Lapse Seismic; May 25, 2010; 153 pgs.
Young, Lee W.; International Search Report & Written Opinion; PCT/US10/55117; Jan. 11, 2011; 8 pgs; ISA/US; Alexandria, Virginia.

(Continued)

*Primary Examiner* — Tan V. Mai
(74) *Attorney, Agent, or Firm* — Crain, Caton & James; John Wustenberg

(57) ABSTRACT

Systems and methods for generating updates of large scale 3D geological models with multi-model facies, permeability or porosity distribution.

20 Claims, 9 Drawing Sheets

(56) References Cited

OTHER PUBLICATIONS

Bui, Bryan; International Preliminary Report on Patentability; PCT/US10/55117; Jan. 11, 2013; 20 pgs.; IPEA/US, Alexandria, Virginia.

Garcia, David P.; Translation of Third Official Action for Mexican Patent Application No. MX/a/2013/004827; Oct. 19, 2014; 2 pgs.; Clarke, Modet.

Juarez, Ing. Maria Angelica Pardavell; Response to Third Official Action for Mexican Patent Application No. MX/a/2013/004827; Oct. 31, 2014; 5 pgs.; Clarke, Modet.

First Office Action for Chinese Patent Application No. 201080071009.1; Dec. 26, 2014; 7 pgs.; Chinese Patent Office.

Response to First Office Action for Chinese Patent Application No. 201080071009.1; May 11, 2015; 10 pgs.; Shanghai Patent & Trademark Law Office.

Strebelle; Sebastian B., et al.; Reservoir Modeling Using Multiple-Point Statistics (SPE 71324); Sep. 3, 2001; 11 pgs.

Rodriguez; Adolfo A., et al.; Assessing Multiple Resolution Scales in History Matching with Metamodels (SPE 105824); Feb. 26, 2007;.

Jafarpour; B.; Reservoir Characterization with the Discrete Cosine Transformation (SPE 106453); Feb. 26, 2007; 20 pgs.

Suziki, S., et al.; History Matching of Naturally Fractured Reservoirs Using Elastic Stress Simulation and Probability Perturbation Method (SPE 95498); Oct. 9, 2005; 20 pgs.

Hoffman, B.T., et al.; Geologically Consistent History Matching of a Deepwater Turbidite Reservoir (SPE 95557); Oct. 9, 2005; 12 pgs.

Fenwick, et al.; Reconciling Prior Geologic Information with Production Data Using Streamlines: Application to a Giant Middle-Eastern Oil Field (SPE 95940); Oct. 9, 2005; 13 pgs.

Maucec, Marko, et al.; Streamline-Based History Matching and Uncertainty: Markov-chain Monte Carlo Study of an Offshore Turbidite Oil Field (SPE 109943); Nov. 11, 2007; 16 pgs.

* cited by examiner

SYSTEMS AND METHODS FOR GENERATING UPDATES OF GEOLOGICAL MODELS

CROSS-REFERENCE TO RELATED APPLICATIONS

The priority of PCT Patent Application No. PCT/US2010/55117, filed on Nov. 2, 2010, is hereby claimed, and the specification thereof is incorporated herein by reference.

STATEMENT REGARDING FEDERALLY SPONSORED RESEARCH

Not applicable.

FIELD OF THE INVENTION

The present invention generally relates to estimating oil and gas recovery for various reservoir production scenarios. More particularly, the present invention relates to generating updates of geological models wherein each update represents a separate geological model realization.

BACKGROUND

Reservoir modeling characterization is generally based on localized, and frequently sparse, observations that are interpolated to return spatial descriptions of uncertain geological properties, such as permeability. The interpolation process introduces uncertainty in the permeability field and translates directly into uncertainty about the reservoir behavior. Reconciling reservoir models with dynamic measurements and field production data, commonly referred to as history matching (HM), can reduce permeability uncertainty. In reservoir modeling, the impact of uncertainty on static geological models usually ranks as follows:

1. Structural Framework (defining gross volumes);
2. Stratigraphic layering (connectivity control);
3. Facies modeling (control over depositional continuity; and
4. Petrophysical modeling (property distribution).

In other words, realistic geological model representations should primarily define correct structural framework and account for the depositional continuity and connectivity control because these properties bare the most significant effect on the fluid flow within the reservoir. It is therefore, a common understanding that HM methods work best when they incorporate realistic facies information. When the permeability field is characterized by finely discretized block values of permeability, the HM problem can be ill-posed. Moreover, if estimated block values of permeability are not constrained to preserve facies connectivity, they may yield geologically inconsistent and unrealistic permeability fields. In order to control ill-posedness and to respect geological facies, a parametric distribution of permeability may be required that is low dimensional, which still preserves the important geological features and their connectivity. This requirement particularly holds true for geological structures with complex geometrical configurations, such as deltaic channels, fluvial deposits, turbidites and shale drapes.

Several conventional parametrization approaches have been proposed and implemented for addressing HM problems. Each approach represents the block values of permeability at any given location with a linear expansion composed of the weighted eigenvectors of the specified covariance matrix for block values of permeability. The computational expense of covariance matrix inversion for realistic field model conditions, increases dramatically when millions of parameters are required and/or when large numbers of geological models are generated. One recent attempt to avoid expensive covariance matrix computations is represented by the Fourier-filter based method as described by M. Maucec, et, al. in *Streamline-based History Matching and Uncertainty: Markov-Chain Monte Carlo Study of an Offshore Turbidite Oil Field* (SPE 109943), where the geological model updates are generated in the Fourier wave domain and an inverse Fast Fourier Transform (FFT) is used to convert back to model (permeability) space. The spatial correlation, however, is modeled with two-point geostatistics by defining a variogram, which makes the description of facies distribution highly challenging if not impossible. The upside of the method is definitely its speed: it is capable of generating a new realization of the permeability field with many variables ($\sim 10^6$) in just a few seconds, thus, omitting the computational and memory cost of the traditional approaches that represent decomposition algorithms.

Within the last decade, several advances have been made in the form of multi-point geostatistics (MPS), which uses correlations between multiple locations at the same time to reproduce volume-variance relationships and geological models conditioned to local sample data. Examples of MPS technology include the techniques described by S. Strebelle in *Reservoir Modeling Using Multiple-Point Statistics* (SPE 71324), and by N. Remy in *A Geostatistical Earth Modeling Library and Software*, a Stanford University thesis, which combine codes like SNESIM and S-GeMS, respectively. The last example is dedicated to the local optimization of parameters involved in variogram-based models to take into account local structural characteristics of the data. MPS, however, has a few main drawbacks, which include: i) dependence on the training images or training data sets; and ii) very long computational times for generating new geological models.

Moreover, current techniques that implement a Discrete Cosine Transform ("DCT")-based parametrization in HM workflows only addresses small-size, two-dimensional (2D) problems with bi-modal permeability distribution.

SUMMARY OF THE INVENTION

The present invention therefore, meets the above needs and overcomes one or more deficiencies in the prior art by providing systems and methods for generating updates of large scale three-dimensional (3D) geological models with multi-model facies, permeability or porosity distribution.

In one embodiment, the present invention includes a method for updating geological models, which comprises: i) performing a normal score transform on a current geological model realization using a computer processor, the current geological model realization belonging to a predefined number of geological model realizations for a geological model; ii) performing a forward discrete DCT on the current geological model realization, the results representing current DCT coefficients; iii) selecting a random sample from the predefined number of geological model realizations or from a distribution of DCT coefficients; iv) performing a normal score transform on the random sample geological model realizations selected; v) performing a forward discrete DCT on the random sample geological realizations processed by the normal score transform, the results representing a random sample of DCT coefficients; vi) truncating the current DCT coefficients and the random sample of DCT coefficients; vii) updating each current DCT coefficient that was truncated; viii) performing an inverse discrete DCT on each updated DCT coefficient, the results representing an updated geological model; ix) performing a normal score transform on the updated geological model, the results representing an updated geological model in zero-mean and unit-variance domain; and x) renormalizing the updated geological model.

In another embodiment, the present invention includes a non-transitory program carrier device tangibly carrying computer executable instructions for updating geological models. The instructions are executable to implement: i) performing a normal score transform on a current geological model realization, the current geological model realization belonging to a predefined number of geological model realizations for a geological model; ii) performing a forward discrete DCT on the current geological model realization, the results representing current DCT coefficients; iii) selecting a random sample from the predefined number of geological model realizations or from a distribution of DCT coefficients; iv) performing a normal score transform on the random sample geological model realizations selected; v) performing a forward discrete DCT on the random sample geological realizations processed by the normal score transform, the results representing a random sample of DCT coefficients; vi) truncating the current DCT coefficients and the random sample of DCT coefficients; vii) updating each current DCT coefficient that was truncated; viii) performing an inverse discrete DCT on each updated DCT coefficient, the results representing an updated geological model; ix) performing a normal score transform on the updated geological model, the results representing an updated geological model in zero-mean and unit-variance domain; and x) renormalizing the updated geological model.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which:

FIG. 10 illustrates the distribution of 9 arbitrarily-selected sample histograms of low frequency (i.e. high energy) DCT coefficients based on the results of step 406a.

DETAILED DESCRIPTION OF THE PREFERRED EMBODIMENTS

Figure 1:
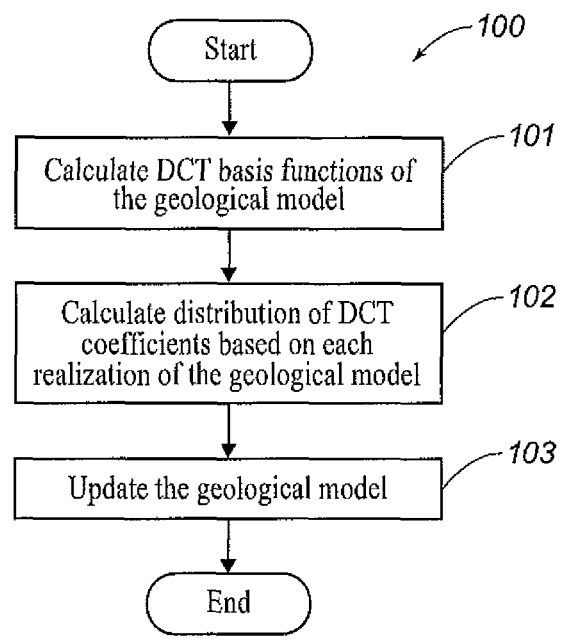
FIG. 1 is a flow diagram illustrating one embodiment of a method for implementing the present invention.

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

Method Description

The present invention generates updates of geological models based on a DCT method. The DCT method is generally described by N. Ahmed, T. Natarajan and K. R. Rao in *Discrete Cosine Transform*, IEEE Transactions on Computers. The DCT method has been applied as an alternative to image compression techniques, such as Discrete Fourier Transform (DFT), Haar transform or Dreamlet transform. The DCT method has shown superior performance over these other techniques for compression purposes and prompted JPEG and MPEG compression standards. The most common definition of a DCT method performed on a one-dimensional (1D) sequence f(x) of length N (i.e. vector with N entries) is given by:

$$C(u) = a(u) \sum_{x=0}^{N-1} f(x) \cos\left[\frac{\pi(2x+1)u}{2N}\right] \quad (1)$$

for u=0, 1, 2, ..., N−1. Here the C(u) represents the DCT sequence of one-dimensional (1D) basis functions with a(u) defined as forward DCT coefficients:

$$a(u) = \begin{cases} \sqrt{\dfrac{1}{N}} & \text{for } u = 0 \\ \sqrt{\dfrac{2}{N}} & \text{for } u \neq 0 \end{cases} \quad (2)$$

It is clear that for u=0, $$C(u=0) = \sqrt{\frac{1}{N}} \sum_{x=0}^{N-1} f(x).$$

Thus, the first transform coefficient is the average value of the sample sequence and is usually referred to as a DC coefficient. All the other transform coefficients are called AC coefficients. The basis vectors of the forward DCT represent the rows of the C(u) transform matrix. The inverse DCT is defined by:

$$f(x) = \sum_{u=0}^{N-1} a(u)C(u)\cos\left[\frac{\pi(2x+1)u}{2N}\right] \quad (3)$$

for x=0, 1, 2, . . . , N−1. The transform coefficients are given with equation (2). Here, the columns of the inverse transformation matrix represent the transform basis vectors. Because the DCT basis vectors are pre-calculated and data independent, they only need to be computed and stored once. The orthogonality of the DCT basis functions facilitates the computation of the inverse transform. The transform is separable by the dimensionality of the model and it can process a multi-dimensional signal using one dimension at a time. This property refers to a separability and allows large signals (i.e. large images of geological model property distributions, such as facies, permeability or porosity) to be segmented into individual model dimensions with the DCT method. As such, large matrix manipulations are avoided and the result is dramatic runtime reductions. Further details on the theory and application of the DCT method are described by S. A. Khayam in *The Discrete Cosine Transform (DCT): Theory and Application*.

The separability property was implemented by the invention with favorable results for rapidly processing large, multi-million cell geological models. Multiple workflows for rapidly generating updates of geological models using the DCT method are possible. The generation of updates for the initial geological model (i.e. distribution of reservoir properties, such as facies, permeability or porosity) is preferably not performed in the space of an independent (such as position) or dependent (such as facies, permeability or porosity value) model variable but rather, in the functional space of another independent variable such as, for example, the wave-number domain. For the specified fraction of DCT coefficients (FRACTION), for example, only the number (FRACTION-NX*NY) of coefficients in 2D computation or the number (FRACTION-NX*NY*NZ) of coefficients in 1D computation will be retained. The definition of an adequate value for FRACTION can be dependent on model/workflow attributes (e.g. size, required accuracy) and subject to optimization.

By generating the geological model updates in the transformed space of DCT coefficients, the following benefits are gained:
 a substantial reduction of computational times can be achieved compared to the traditional non-parametrized approaches;
 the flexibility to directly control the amount of image information/energy transferred to the updated geological model can be retained;
 the speed of convergence in progressing from the prior model space to posterior model space, once the algorithm is, for example, integrated into workflows for stochastic data inversion and Assistant History Matching (AHM).

Referring now to FIG. 1, a flow diagram illustrates one embodiment of a method 100 for implementing the present invention.

Figure 2:
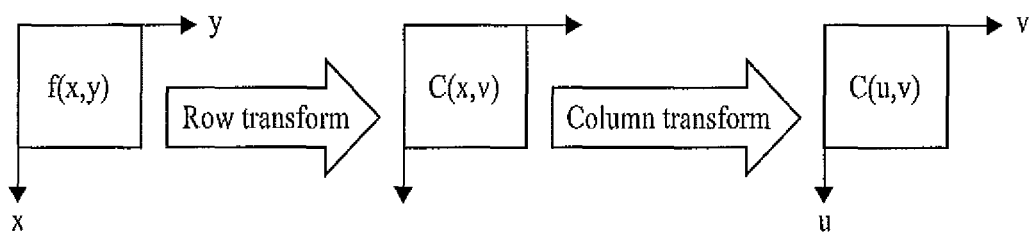
FIG. 2 is a mathematical diagram illustrating a separability property.

In step 101, the DCT basis functions of the geological model are calculated. The basis functions for the DCT are model independent and only have to be calculated once. In other words, only the overall dimensions of the model are required (e.g. NX, NY and NZ, as the number of grid cells in x, y and z-direction, respectively) in order to calculate the set of DCT basis functions. The property of separability, which is illustrated in FIG. 2, is used to perform the calculation of the DCT basis functions corresponding to arbitrary 3D volumes. This may be done by the decomposition of the 3D volume into NZ layers of 2D images (i.e. 2D maps of a property for the geological model, such as facies, permeability or porosity distribution). In other words, the computation of the 2D DCT basis functions is performed in two steps by successive 1D operations on rows and columns of the 2D image using equations (1) and (2).

Mathematically, the process illustrated in FIG. 2 outlines the computation of the DCT basis functions as follows:

$$C(u,v) = a(u)a(v) \sum_{x=0}^{NX-1} f(x)\cos\left[\frac{\pi(2x+1)u}{2*NX}\right] \sum_{y=0}^{NY-1} f(x)\cos\left[\frac{\pi(2y-1)u}{2*NY}\right] \quad (4)$$

for u=0, 1, 2, . . . , NX−1 and v=0, 1, 2, . . . , NY−1. Here, C(u,v) represents the sequence of 2D DCT basis functions. By implementing equation (4), two arrays of DCT basis coefficients, (GX∈ℜ$^{NX*NX}$ and GY∈ℜ$^{NY*NY}$) are generated for the x- and y-directions, respectively. This operation is performed sequentially for NZ layers of the 3D model. Because a series of relatively efficient array manipulations is performed, the speed of execution is virtually independent on the NX*NY dimensions for the 2D map of the original model.

In step 102, the distribution of DCT coefficients is calculated based on each realization of the geological model. The distribution of DCT coefficients only has to be calculated once. The number of geological model realizations, which in practical terms represent a prior model distribution, is typically an arbitrary predetermined quantity. However, because the update of the geological model is based on statistical sampling from a prior distribution, the number of geological model realizations should be selected sufficiently large to assure drawing statistically unbiased samples.

Figure 3:
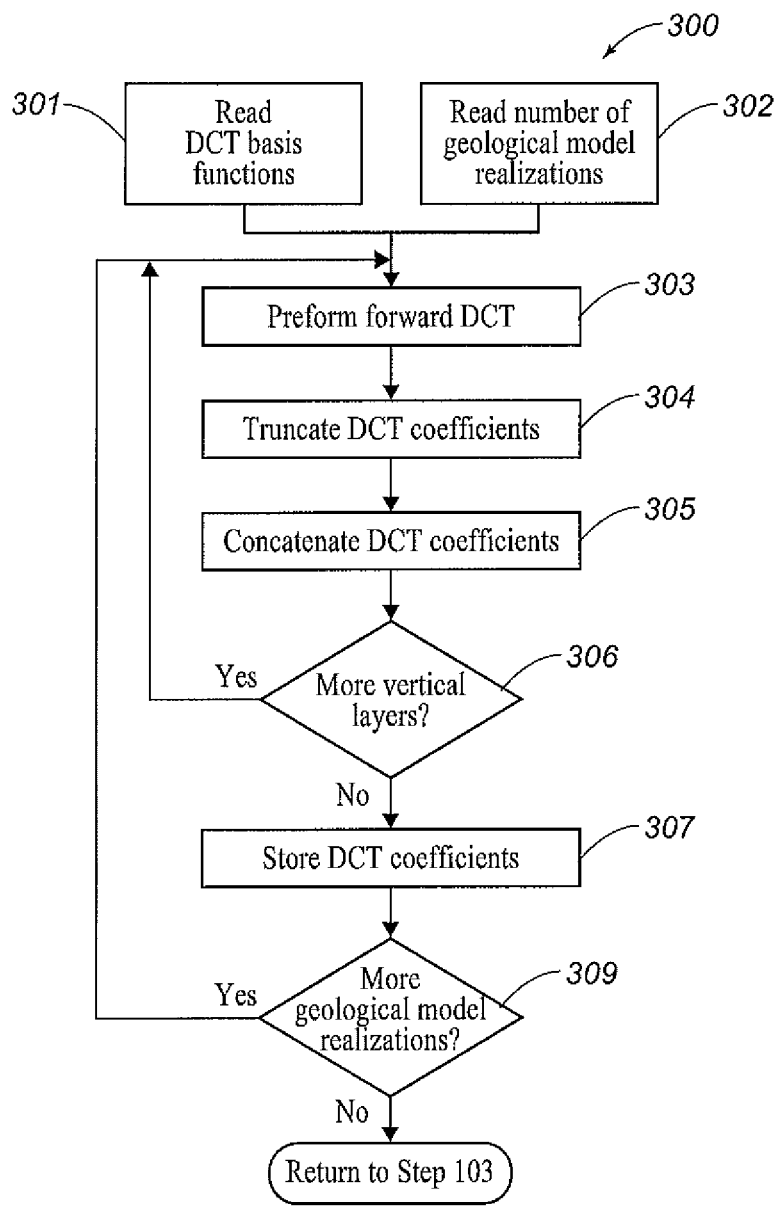
FIG. 3 is a flow diagram illustrating one embodiment of a method for implementing step 102 in FIG. 1.

Referring now to FIG. 3, a flow diagram illustrates one embodiment of a method 300 for implementing step 102 in FIG. 1.

In step 301, the DCT basis functions calculated in step 101 are read (input) into the method 300.

In step 302, the number of geological model realizations for the geological model in step 101 (e.g. facies, permeability or porosity distribution) are read (input) into the method 300.

In step 303, a forward DCT is performed using the separability property and the input from steps 301, 302. This is performed using a simple matrix multiplication:

$$\text{PERM\_}DCT = GX^T * \text{PERM} * GY \quad (5)$$

where PERM represents a particular member of the original number of geological model realizations from step 302, PERM_DCT represents an array with the corresponding DCT basis functions from step 301 and subscript "T" denotes the matrix transpose. The results represent DCT coefficients.

In step 304, the results from step 303 are truncated. This is done by eliminating high-frequency (and low-energy) DCT coefficients while retaining only the user-specified number of low-frequency (and high-energy) DCT coefficients that usually describe only a user-defined fraction of the full space. The remaining DCT coefficients are referred to as retained DCT coefficients, which affect the fidelity and resolution of the permeability model realizations illustrated in FIG. 9.

In step 305, the DCT coefficients truncated in step 304 are concatenated. When generating model updates using a discrete 2D DCT method, which operates on 2D arrays of reservoir property (e.g. facies, permeability or porosity) and not 1D vectors, the distribution of DCT coefficients is calculated on a "per structural layer" basis for all NZ layers. In this event, the results of step 304 are concatenated into a full 3D block of reservoir property. This is performed by the vertical concatenation of 2D maps of DCT coefficients into a 3D block, which is a procedure well known in the art.

In step 306, the method 300 determines if there are more vertical layers for each geological model realization from step 302. If there are no more vertical layers, then the method 300 proceeds to step 307. If there are more vertical layers, then the method 300 returns to step 303.

In step 307, the DCT coefficients concatenated in step 305 are stored. Because the method 300 is executed over the entire number of geological model realizations, step 307 corresponds to the storage of the 3D blocks with calculated DCT coefficients.

In step 309, the method 300 determines if there are more geological model realizations from step 302. If there are no more geological model realizations, then the method 300 returns to step 103 in FIG. 1. If there are more geological model realizations, then the method 300 returns to step 303. The results from steps 101 and 102 can be repeatedly reused in step 103. The number of repetitions will be defined by the user and is related to the dimensionality of the initial geological model as well as the number of model inversion iterations.

In step 103, the geological model is updated using the distribution of DCT coefficients calculated in step 102.

In the alternative, steps 101 and 102 in FIG. 1 may be combined into a single step for simply reading a large number (i.e. distribution) of geological model (e.g. facies, permeability or porosity) realizations. In other words, the pre-calculation of DCT basis functions (step 101) can be integrated into step 102 and executed individually for every geological model in real-time. With respect to FIG. 3, this alternative implementation would remove steps 301 and 303-309 from method 300.

Figure 4A:
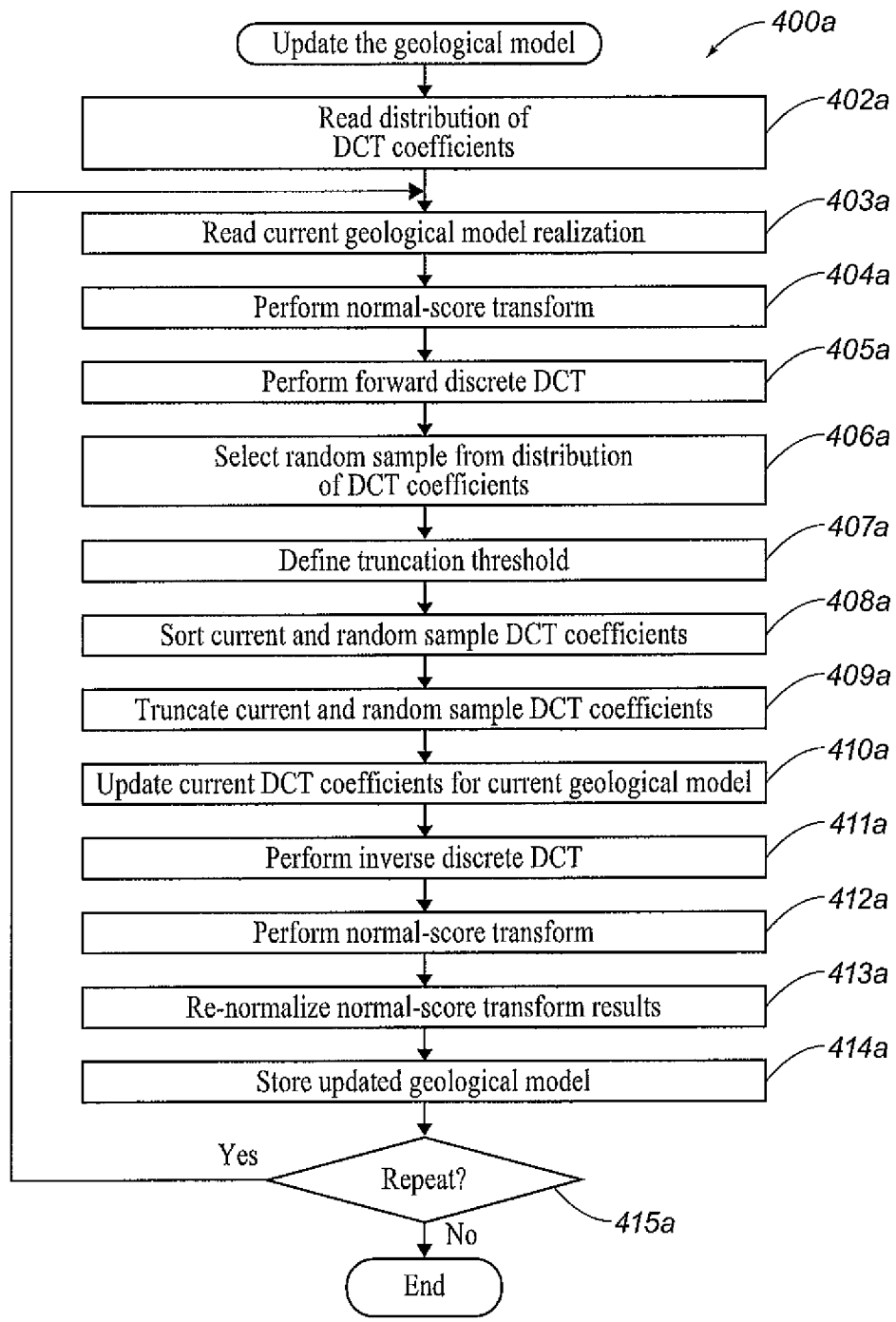
FIG. 4A is a flow diagram illustrating one embodiment of a method for implementing step 103 in FIG. 1.

Referring now to FIG. 4A, a flow diagram illustrates one embodiment of a method 400a for implementing step 103 in FIG. 1.

In step 402a, the distribution of DCT coefficients calculated in step 102 are read (input) into the method 400a.

In step 403a, the current geological model realization is read (input) into the method 400a from the geological model realizations in step 302.

In step 404a, a normal-score transform is performed on the current geological model realization. The normal-score transform transforms the current geological model realization into zero-mean and unit-variance domain:

$$m_o = m - \text{mean}(m) \quad (6)$$

$$m_o^* = m_o / \text{std}(m_o) \quad (7)$$

where m, $m_o$ and $m_o^*$ correspond to the vectors of the current model realization, the zero-mean current model realization and the zero-mean, unit-variance current model realization, respectively. The mean corresponds to arithmetic mean and std corresponds to a standard deviation of model realization vector.

In step 405a, a forward discrete 1D DCT is performed on the current geological model realization from step 404a using equation (1). The results represent current DCT coefficients.

In step 406a, a random sample is selected from the distribution of DCT coefficients read in step 402a. Because an unbiased distribution of model realizations is assumed (i.e. throughout the size of the statistically representative sample) no preference in sampling is taken. The index of the random sample is therefore, calculated from the uniform distribution in the interval [1, Distribution_size], where Distribution_size corresponds to the number of DCT coefficients read in step 402a:

$$\text{sample\_index} = 1 + (\text{Distribution\_size} - 1) * \text{rand}(1) \quad (8)$$

where sample_index is drawn and rounded to the nearest integer. The random sample is then selected as DCT coefficients as a function of sample_index.

Figure 11:
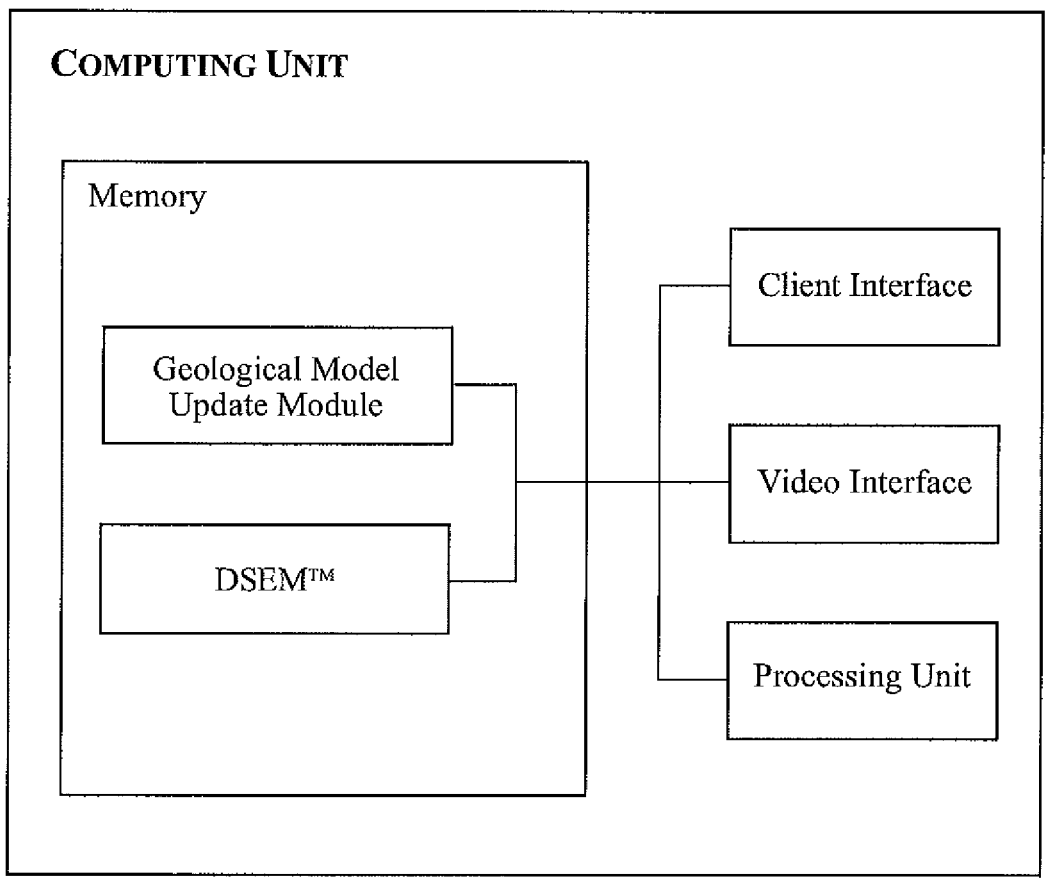
FIG. 11 is a block diagram illustrating one embodiment of a system for implementing the present invention.

In step 407a, a truncation threshold may be defined using the client interface and/or video interface described in reference to FIG. 11.

In step 408a, the absolute values for the current DCT coefficients in step 405a and for the random sample DCT coefficients in step 406a may be sorted in descending order.

In step 409a, the current DCT coefficients and the random sample DCT coefficients are truncated. The current DCT coefficients and the random sample DCT coefficients may be truncated after or without sorting in step 408a using the truncated threshold defined in step 407a.

In step 410a, the current DCT coefficient(s) truncated in step 409a are updated by perturbing those coefficients according to:

$$\text{PERM\_DCT\_update} = (1-\delta)*\text{PERM\_DCT\_current} + \delta*\text{PERM\_DCT\_sample} \quad (9)$$

where $\delta$ corresponds to the degree of perturbation related to the step-size of the Markov chain Monte Carlo (MCMC) sampler. In other words, the size of the delta value ($\delta$) basically relates to the convergence rate for the MCMC transition process.

In step 411a, an inverse discrete 1D DCT is performed on PERM_DCT_update using equation (3). When operating in a discrete 2D DCT domain, the inverse form of equation (5) is used, instead:

$$\text{PERM\_update} = GX*\text{PERM\_DCT\_update}*GY^T \quad (10)$$

where subscript "T" denotes the matrix transpose. The results represent an updated geological model.

In step 412a, a normal-score transform is performed on the updated geological model from step 411a using equations (6) and (7). The results represent an updated geological model in zero-mean and unit-variance domain.

In step 413a, the result from step 412a is re-normalized into the original physical domain of reservoir property (e.g. facies, permeability or porosity) to preserve the mean and the variance of the results from step 411a and the results from step 412a. In order to renormalize the result from step 412a, an inverse normal-score transform is performed where the transform weights (e.g. mean and standard deviation) are calculated by:

$$\text{update\_mean} = (1-\delta)*\text{current\_mean} + \delta*\text{sample\_mean} \quad (11)$$

$$\text{update\_std} = (1-\delta)*\text{current\_std} + \delta*\text{sample\_std} \quad (12)$$

and the result from step 412a is re-normalized by:

$$\text{update} = \text{update}'*\text{update\_std} + \text{update\_mean}. \quad (13)$$

In step 414a, the re-normalized result from step 413a (updated geological model) is stored.

In step 415a, the method 400a determines whether to repeat the steps required to update another geological model. This is based on the user-predefined number of geological model realizations from step 302. If there are no more geological model realizations, then the method 400a ends. If there are more geological model realizations, then the method 400a returns to step 403a to update another geological model based on the next current geological model realization. The method 400a therefore, can be automatically repeated as many times as preferred to generate numerous geological model updates.

The results of method 400a may be particularly useful alone or in connection with other applications such as, for example, the methods for updating posterior geological models described in International Application Serial No. PCT/US09/58504 assigned to Landmark Graphics Corporation.

Figure 4B:
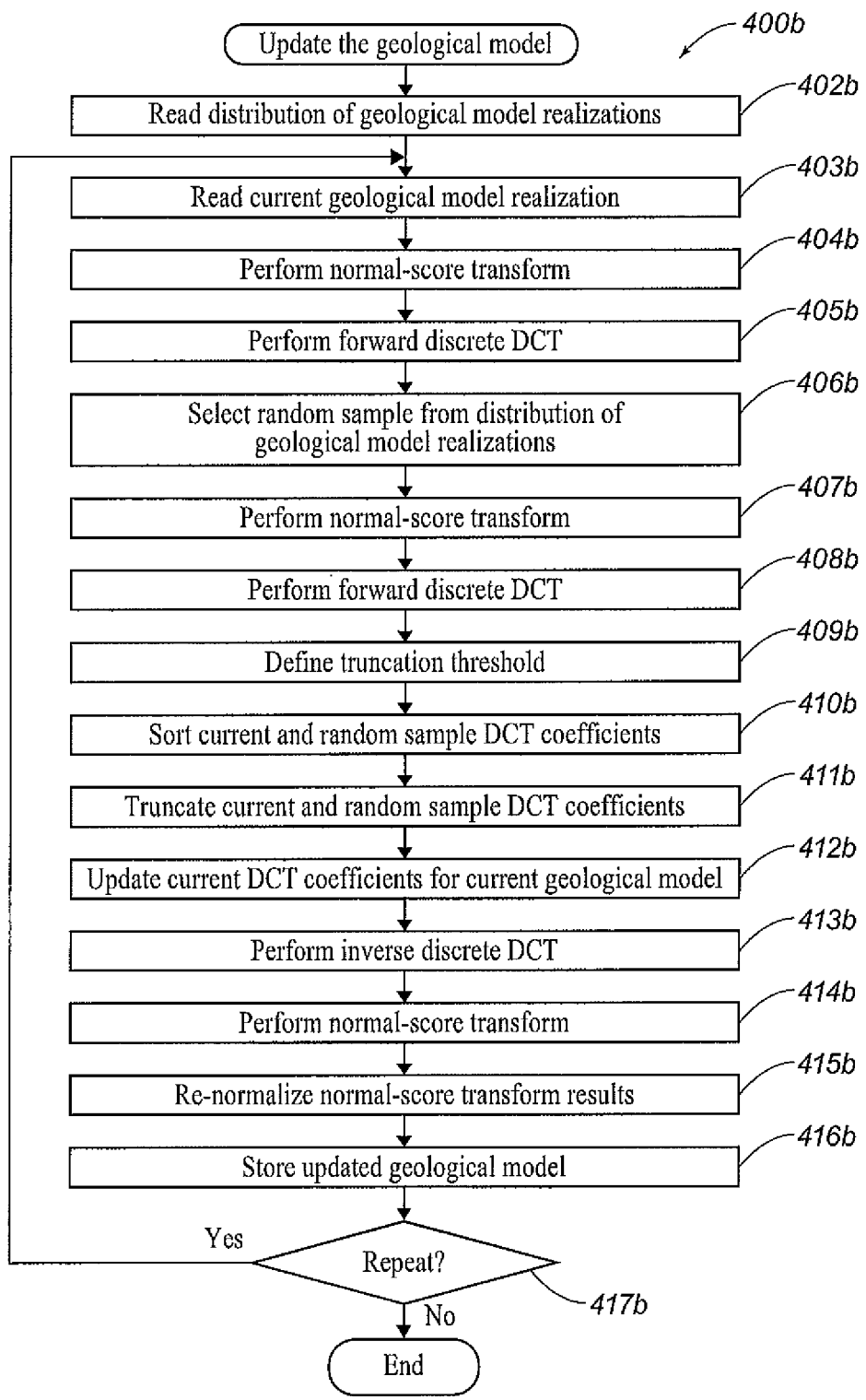
FIG. 4B is a flow diagram illustrating another embodiment of a method for implementing step 103 in FIG. 1.

Referring now to FIG. 4B, a flow diagram illustrates another embodiment of a method 400b for implementing step 103 in FIG. 1.

In step 402b, the geological model realizations (i.e. 3D facies, permeability or porosity distribution) from the alternative combination of steps 101 and 102 (i.e. from step 302) are read (input) into the method 400b.

In step 403b, the current geological model realization is read (input) into the method 400b from the geological model realizations in step 302.

In step 404b, a normal-score transform is performed on the current geological model realization. The normal-score transform transforms the current geological model realization into zero-mean and unit-variance domain:

$$m_o = m - \text{mean}(m) \tag{14}$$

$$m_o{}^* = m_o/\text{std}(m_o) \tag{15}$$

where m, $m_o$ and $m_o{}^*$ correspond to the vectors of current model realization, zero-mean current model realization and zero-mean, unit-variance current model realization, respectively. The mean corresponds to arithmetic mean and std corresponds to standard deviation of model realization vector.

In step 405b, a forward discrete 1D DCT is performed on the current geological model realization from step 404b using equation (1). The results represent current DCT coefficients.

In step 406b, a random sample is selected from the distribution of geological model realizations read in step 402b. Because an unbiased distribution of model realizations is assumed (i.e. throughout the size of the statistically representative sample) no preference in sampling is taken. The index of the random sample is therefore, calculated from the uniform distribution in the interval [1,Distribution_size], where Distribution_size corresponds to the number of geological model realizations read in step 402b:

$$\text{sample\_index} = 1 + (\text{Distribution\_size} - 1)*\text{rand}(1) \tag{16}$$

where sample_index is drawn and rounded to the nearest integer. The random sample is then selected as geological model realizations as a function of sample_index.

In step 407b, a normal-score transform is performed on the random sample geological model realizations using equations (14) and (15) to convert the sample to a zero-mean, unit-variance domain.

In step 408b, a forward discrete 1D DCT is performed on the random sample geological model realizations from step 407b using equation (1). The results represent random sample DCT coefficients.

In step 409b, a truncation threshold may be defined using the client interface and/or video interface described in reference to FIG. 11.

In step 410b, the absolute values for the current DCT coefficients in step 405b and for the random sample DCT coefficients in step 408b may be sorted in descending order.

In step 411b, the current DCT coefficients and the random sample DCT coefficients are truncated. The current DCT coefficients and the random sample DCT coefficients may be truncated after or without sorting in step 410b using the truncation threshold defined in step 409b.

In step 412b, the current DCT coefficients truncated in step 411b are updated by perturbing those coefficients according to:

$$\text{PERM\_}DCT\text{\_update} = (1-\delta)*\text{PERM\_}DCT\text{\_current} + \delta*\text{PERM\_}DCT\text{\_sample} \tag{17}$$

where $\delta$ corresponds to the degree of perturbation directly related to the step-size of the Markov chain Monte Carlo (MCMC) sampler. In other words, the size of the delta value ($\delta$) basically relates to the convergence rate for the MCMC transition process.

In step 413b an inverse discrete 1D DCT is performed on PERM_DCT_update using equation (3). When operating in a discrete 2D DCT domain, the inverse form of equation (5) is used, instead:

$$\text{PERM\_update} = GX*\text{PERM\_}DCT\text{\_update}*GY^T \tag{18}$$

where subscript "T" denotes the matrix transpose. The results represent an updated geological model.

In step 414b, a normal-score transform is performed on the updated geological model from step 413b using equations (6) and (7). The results represent an updated geological model in zero-mean and unit-variance domain.

In step 415b, the result from step 414b is re-normalized into the original physical domain of reservoir property (e.g. facies, permeability or porosity) to preserve the mean and the variance of the results from step 413b and the results from step 414b. In order to re-normalize the results from step 414b, an inverse normal-score transform is performed where the transform weights (e.g. mean and standard deviation) are calculated by:

$$\text{update\_mean} = (1-\delta)*\text{current\_mean} + \delta*\text{sample\_mean} \tag{19}$$

$$\text{update\_std} = (1-\delta)*\text{current\_std} + \delta*\text{sample\_std} \tag{20}$$

and the result from step 414b is re-normalized by:

$$\text{update} = \text{update'}*\text{update\_std} + \text{update\_mean}. \tag{21}$$

In step 416b, the re-normalized result from step 415b (updated geological model) is stored.

In step 417b, the method 400b determines whether to repeat the steps required to update another geological model. This is based on the predefined number of geological model realizations from step 302. If there are no more geological model realizations, then the method 400b ends. If there are more geological model realizations, then the method 400b returns to step 403b to update another geological model based on the next current geological model realization. The method 400b therefore, can be automatically repeated as many times as preferred to generate numerous geological model updates.

The results of method 400b may be particularly useful alone or in connection with other applications such as, for example, the methods for updating posterior geological models described in International Application Serial No. PCT/US09/58504 assigned to Landmark Graphics Corporation.

Examples

Figures 5, 6:
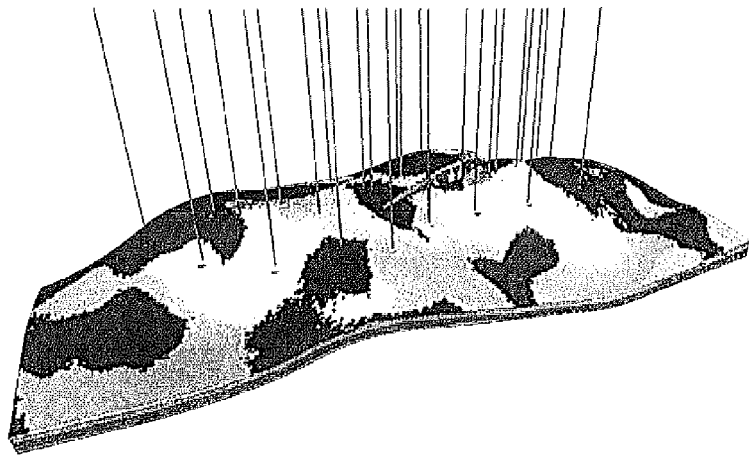
FIG. 5 illustrates an example of a facies constraint for a geological model calculated by the combination of steps 101 and 102 in FIG. 1 for a Brugge field model.
FIG. 6 illustrates the realization of permeability maps in a log-permeability mode for all 56 layers of the Brugge field model.

The method 100 in FIG. 1 was benchmarked on a fairly complex synthetic model of the Brugge field. In FIG. 5, for example, a facies constraint for a geological model is illustrated for the Brugge field model with dimensions 211*76*56 (~900 k cells). The facies realization was calculated according to step 101 in FIG. 1. The Brugge field model has four depositional environments: fluvial (discrete sand bodies in shale), lower shore face, upper shore face (loggers, carbonate concretions), and sandy shelf irregular carbonate patches. The fluvial reservoir (i.e. the most interesting benchmark model for the proposed method due to its distinctive facies distribution) extends between layers 1 and 6 (not shown).

In FIG. 6, the realization of permeability maps in a log-permeability mode for all 56 layers of the Brugge field model is illustrated. The log-permeability maps are thus, constrained by the facies constraint illustrated in FIG. 5. The complexity in facies distribution of primarily the top six layers indicates why they are of the primary interest as the method benchmark case because they represent a fluvial depositional system that demonstrates a clear channel-type spatial distribution of facies.

Figure 7:
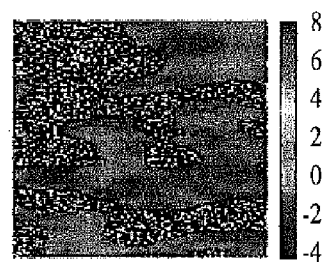
FIG. 7 illustrates a separate log-permeability map for layer 1 in FIG. 6.

In FIG. 7, a separate log-permeability map is illustrated for layer 1 in FIG. 6. This layer should be considered as the top layer of the initial static geological model from which a set of new realizations can be reproduced. The log-permeability map is also constrained by the facies constraint illustrated in FIG. 5.

Figure 8:
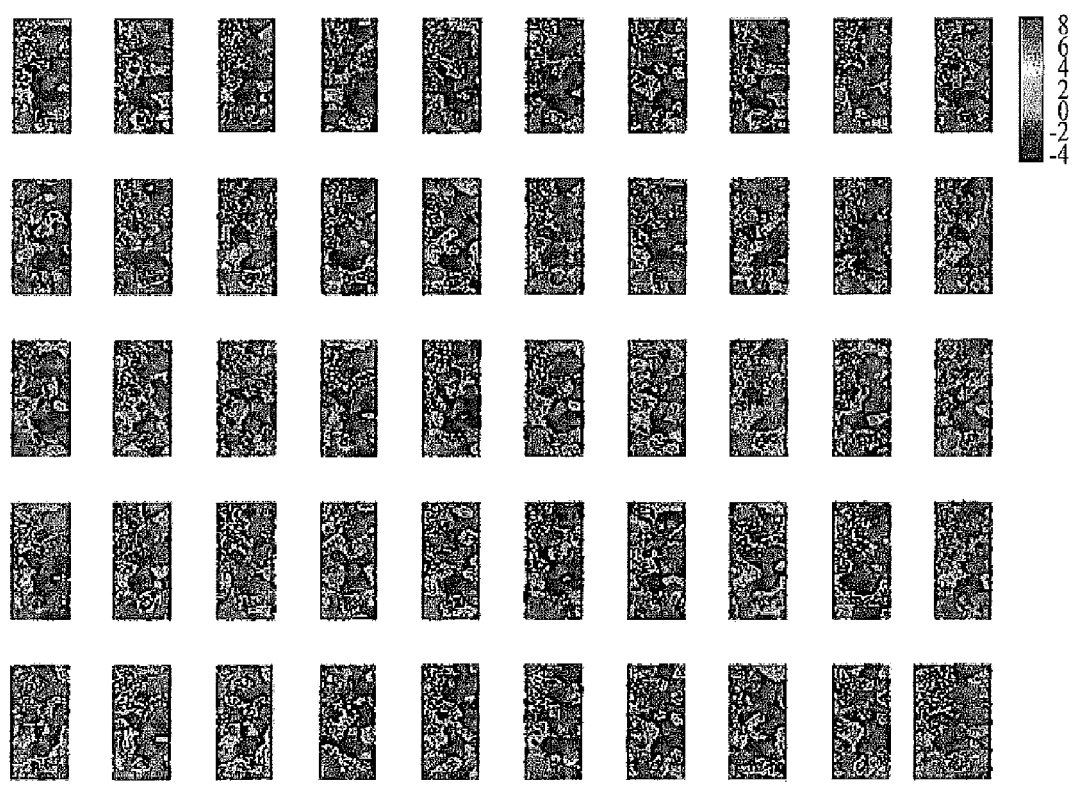
FIG. 8 illustrates a set of 50 permeability model realizations in a log-permeability mode for the layer in FIG. 7.
Figure 9:
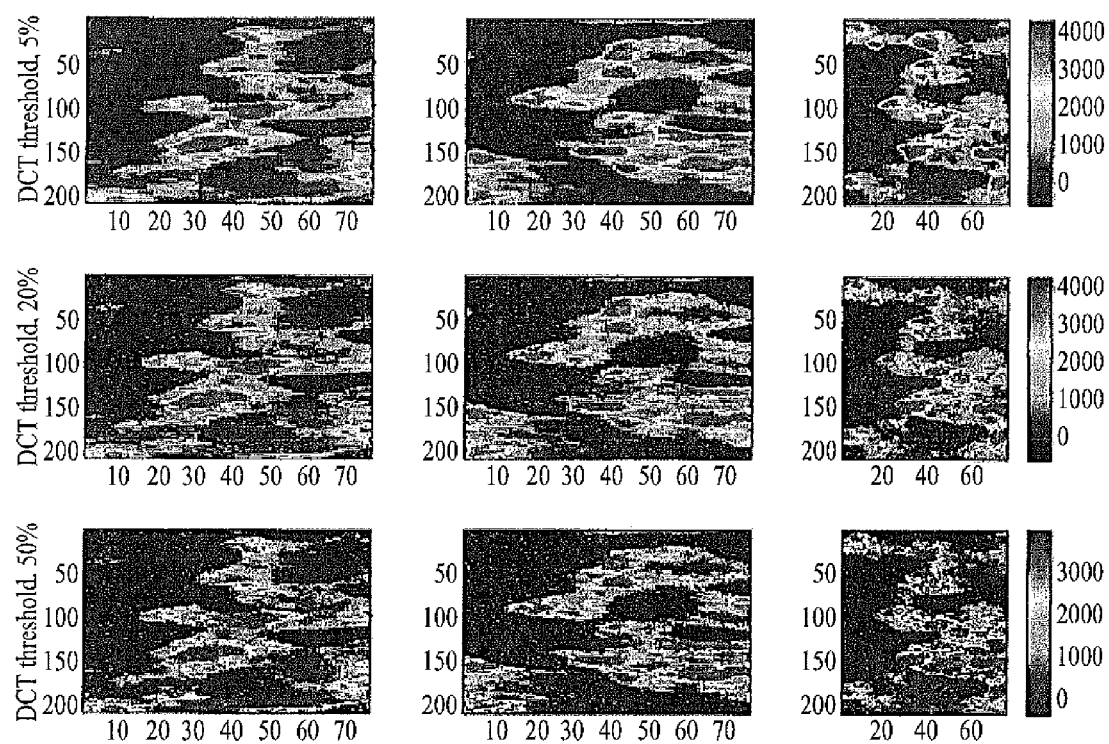
FIG. 9 illustrates the permeability model realizations for FIG. 8 in a permeability mode using a variety of truncated DCT coefficients for 5%, 20%, and 50% of retained DCT coefficients.

In FIG. 8, a set of 50 permeability model realizations for the layer in FIG. 7 is illustrated in a log-permeability mode. The permeability model realizations are also constrained by the facies constraint illustrated in FIG. 5 and represent the permeability model realizations for the geological model updated according to the method 400b. The results indicate that new geological model realizations in log-permeability mode successfully retain the geological realism of the initial geological model and maintain the mean, minimum and maximum values of the initial geological model. This is achieved by conserving the energy of the retained DCT coefficients and proper normalization of the updated geological model. The high fidelity of the main facies distribution of the initial geological model should be attributed to the fact that the results correspond to the use of the full space (i.e. non-truncated) of the DCT coefficients. Any user-defined DCT space truncation rate can of course be applied by this method, should the computational conditions require so (i.e. when performing parametrization and updates of large (multi-million) cell geological models). In FIG. 9, the permeability model realizations in FIG. 8 are represented in a permeability mode using a variety of truncated DCT coefficients for 5%, 20% and 50% of retained DCT coefficients.

Figure 10:
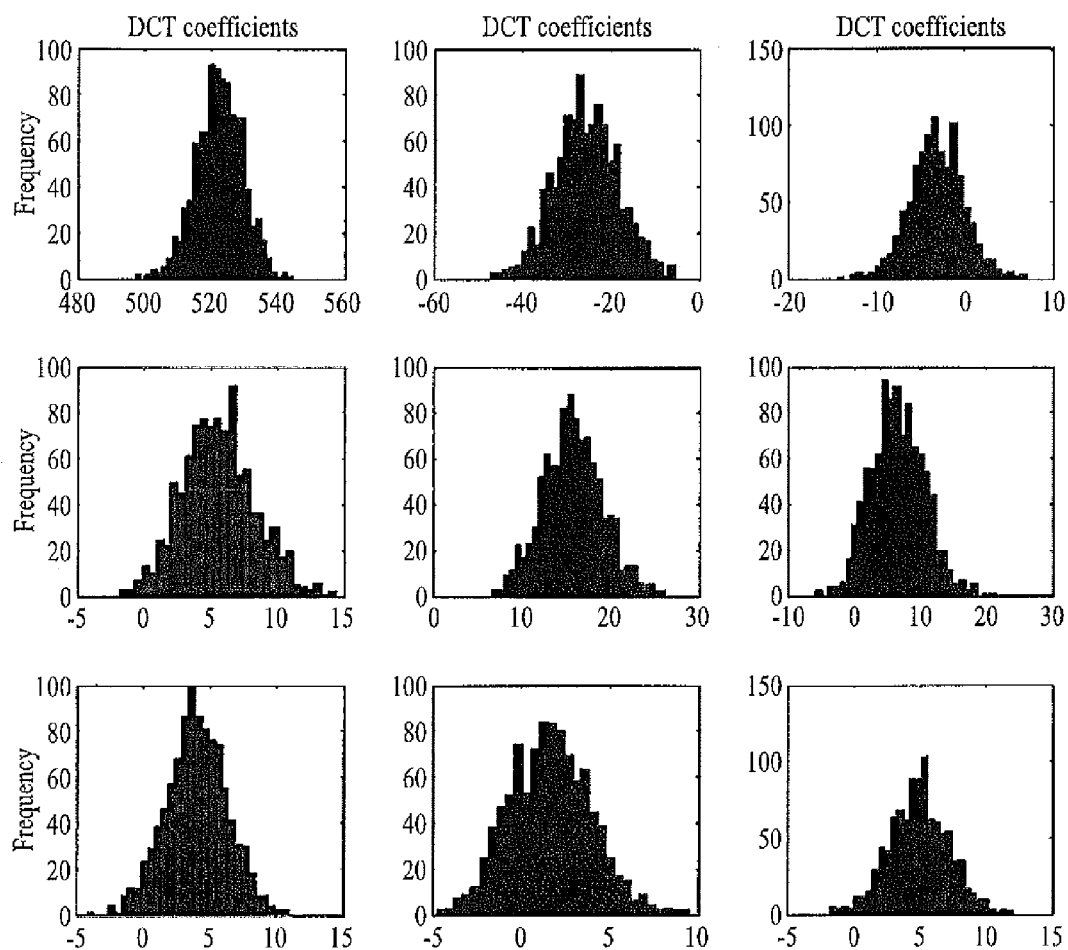

In FIG. 10, the distribution of nine arbitrarily selected sample histograms of low-frequency (i.e. high-energy) DCT coefficients are illustrated based on the results of step 406a. A sample size of 1000 facies-constrained model realizations was used to generate the histograms. Interestingly, they all follow near-Gaussian distribution, despite the fact that the permeability distribution is usually bi- or multi-modal.

The foregoing examples demonstrate the present invention is extremely fast in selecting random samples from the distribution of DCT coefficients and updating the geological model in the wave-number domain.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace Desktop Earth Modeling (DSEM™), which is a commercial software application marketed by Landmark Graphics Corporation, may be used to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 11, a block diagram of a system for implementing the present invention on a computer is illustrated. The system includes a computing unit, sometimes referred to a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-10. The memory therefore, includes a geological model update module, which enables the methods illustrated and described in reference to FIGS. 1-4 and integrates functionality from the remaining application programs illustrated in FIG. 11. In particular, DSEM™ may be used to execute the functions described in reference to step 403a in FIG. 4A and steps 402b, 403b and 406b in FIG. 4B. The geological model update module is used to execute the remaining steps in FIGS. 4A and 4B and FIGS. 1-3.

Although the computing unit is shown as having a generalized memory, the computing unit typically includes a variety of computer readable media. By way of example, and not limitation, computer readable media may comprise computer storage media. The computing system memory may include computer storage media in the form of volatile and/or non-volatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/non-volatile computer storage media or they may be implemented in the computing unit through application program interface ("API"), which may reside on a separate computing unit connected through a computer system or network. For example only, a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

The present invention can generate a full 3D update for a ~900 k cell Brugge field model in less than 2 seconds. However, the standard DSEM API always executes two sequential simulations, a facies simulation and facies-constrained petrophysical (PP) simulation. By transforming the problem from the reservoir property (e.g. facies, permeability or porosity) model space into the wave-number domain of the DCT, the present invention only operates on updating the facies, permeability or porosity distribution but, as such, retains a full (or lesser if truncated) degree of realism captured in the main model of facies, permeability or porosity distribution. The preset invention therefore, is capable of:

generating an update of geological model with ~900 k cells in a few seconds;
adhering, with a high-degree, to the geological detail of the static model;
producing statistically unbiased prior model realizations through the de-correlation property of DCT; and
being free of any foreseen technical obstacle for the implementation of multi-million-sized models.

Moreover, the present invention addresses the generation of multiple geological model realizations and, as such, represents a vital component of the technology for stochastic inversion under uncertainty and conforms to the following requirements:

High speed: is capable of rapidly drawing samples from the distribution of prior geological models;
Adherence to geological detail: reproduces facies distribution of complex geological structures to a high degree to maintain reservoir connectivity;
Statistical soundness: draws statistically un-biased samples from the distribution of prior geological models; and
Robustness: performs efficiently on real, large-scale (i.e. multi-million grid cell) models.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for updating geological models, comprising:
a) performing a normal score transform on a current geological model realization using a computer processor, the current geological model realization belonging to a predefined number of geological model realizations for a geological model;
b) performing a forward discrete DCT on the current geological model realization, the results representing current DCT coefficients;
c) selecting a random sample from the predefined number of geological model realizations or from a distribution of DCT coefficients;
d) performing a normal score transform on the random sample geological model realizations selected;
e) performing a forward discrete DCT on the random sample geological realizations processed by the normal score transform, the results representing a random sample of DCT coefficients;
f) truncating the current DCT coefficients and the random sample of DCT coefficients;
g) updating each current DCT coefficient that was truncated;
h) performing an inverse discrete DCT on each updated DCT coefficient, the results representing an updated geological model;
i) performing a normal score transform on the updated geological model, the results representing an updated geological model in zero-mean and unit-variance domain; and
j) renormalizing the updated geological model.

2. The method of claim 1, further comprising repeating the steps in claim 1 for each of the predefined number of geological model realizations.

3. The method of claim 1, further comprising:
defining a truncation threshold; and
sorting the current DCT coefficients and the random sample DCT coefficients.

4. The method of claim 3, wherein the current DCT coefficients and the random sample DCT coefficients are truncated using the truncation threshold after the current DCT coefficients and the random sample DCT coefficients are sorted.

5. The method of claim 3, wherein the current DCT coefficients and the random sample DCT coefficients are sorted in descending order according to an absolute value for each current DCT coefficient and each random sample DCT coefficient.

6. The method of claim 1, wherein each current DCT coefficient is updated by perturbing each current DCT coefficient.

7. The method of claim 6, wherein each current DCT coefficient is perturbed according to:

PERM_*DCT*_update=(1−δ)*PERM_*DCT*_current+ δ*PERM_*DCT*_sample.

8. The method of claim 1, wherein the inverse discreet DCT is performed on each updated DCT coefficient according to:

$$f(x) = \sum_{u=0}^{N-1} a(u)C(u)\cos\left[\frac{\pi(2x+1)u}{2N}\right].$$

9. The method of claim 1, wherein the inverse discreet DCT is performed on each updated DCT coefficient according to:

PERM_update=$GX$*PERM_*DCT*_update*$GY^T$.

10. The method of claim 1, wherein the random sample is selected from the distribution of DCT coefficients.

11. A non-transitory program carrier device tangibly carrying computer executable instructions for updating geological models, the instructions being executable to implement:
  a) performing a normal score transform on a current geological model realization, the current geological model realization belonging to a predefined number of geological model realizations for a geological model;
  b) performing a forward discrete DCT on the current geological model realization, the results representing current DCT coefficients;
  c) selecting a random sample from the predefined number of geological model realizations or from a distribution of DCT coefficients;
  d) performing a normal score transform on the random sample geological model realizations selected;
  e) performing a forward discrete DCT on the random sample geological realizations processed by the normal score transform, the results representing a random sample of DCT coefficients;
  f) truncating the current DCT coefficients and the random sample of DCT coefficients;
  g) updating each current DCT coefficient that was truncated;
  h) performing an inverse discrete DCT on each updated DCT coefficient, the results representing an updated geological model;
  i) performing a normal score transform on the updated geological model, the results representing an updated geological model in zero-mean and unit-variance domain; and
  j) renormalizing the updated geological model.

12. The non-transitory program carrier device of claim 11, further comprising repeating the steps in claim 1 for each of the predefined number of geological model realizations.

13. The program carrier device of claim 11, further comprising:
  defining a truncation threshold; and
  sorting the current DCT coefficients and the random sample DCT coefficients.

14. The program carrier device of claim 13, wherein the current DCT coefficients and the random sample DCT coefficients are truncated using the truncation threshold after the current DCT coefficients and the random sample DCT coefficients are sorted.

15. The program carrier device of claim 13, wherein the current DCT coefficients and the random sample DCT coefficients are sorted in descending order according to an absolute value for each current DCT coefficient and each random sample DCT coefficient.

16. The program carrier device of claim 11, wherein each current DCT coefficient is updated by perturbing each current DCT coefficient.

17. The program carrier device of claim 16, wherein each current DCT coefficient is perturbed according to:

PERM_*DCT*_update=(1−δ)*PERM_*DCT*_current+ δ*PERM_*DCT*_sample.

18. The program carrier device of claim 11, wherein the inverse discreet DCT is performed on each updated DCT coefficient according to:

$$f(x) = \sum_{u=0}^{N-1} a(u)C(u)\cos\left[\frac{\pi(2x+1)u}{2N}\right].$$

19. The program carrier device of claim 11, wherein the inverse discreet DCT is performed on each updated DCT coefficient according to:

PERM_update=$GX$*PERM_*DCT*_update*$GY^T$.

20. The program carrier device of claim 11, wherein the random sample is selected from the distribution of DCT coefficients.

* * * * *